Figure 1:
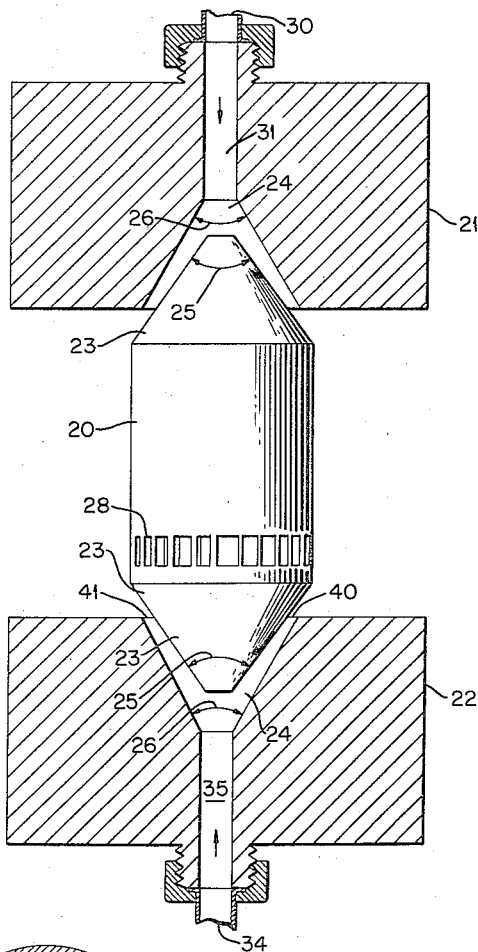

Sept. 30, 1958  H. K. BAUMEISTER  2,854,298
AXIAL AND RADIAL THRUST BEARING
Filed Jan. 13, 1956

INVENTOR.
HEARD K. BAUMEISTER
BY Paul M Enlow
AGENT

United States Patent Office 2,854,298
Patented Sept. 30, 1958

2,854,298

AXIAL AND RADIAL THRUST BEARING

Heard K. Baumeister, New York, N. Y., assignor to International Business Machines Corporation, New York, N. Y., a corporation of New York Application January 13, 1956, Serial No. 558,915

8 Claims. (Cl. 308—172)

This invention relates to axial and radial thrust type bearings and more particularly, to bearings of this type which are lubricated by a fluid lubricant such as air or oil.

Numerous bearings are known which function hydrodynamically or hydrostatically which utilize a fluid lubricant such as air or oil in order to take advantage of the low friction properties associated with such bearings. Bearings of this type frequently employ a wedge-shaped oil film in the direction of relative motion of the bearing surfaces. Frequently air is used as a lubricant in order to take advantage of the freedom from contamination of the lubricant by dirt and material which might tend to collect in and around the bearing. However, most of the presently known hydrodynamic and hydrostatic type bearings lack stability when the bearing is supporting a journal rotating at very high speeds. Furthermore, such systems frequently become unstable when the speed of rotation of the journal is increased beyond 100,000 R. P. M.

Accordingly, it is an object of this invention to provide a novel bearing which reacts to axial and radial thrust load while supporting a journal rotating at very high speeds. Another object is to provide a fluid lubricated bearing which is stable, which is angularly self-aligning, and which may be rotated in either direction.

A further object is to provide a novel bearing wherein a hydrodynamic pressure is developed which tends to prevent a loaded rotating journal or member from making contact with its associated bearing block thereby providing a low coefficient of friction.

A still further object of this invention is to provide an axial and radial thrust bearing capable of supporting a loaded journal rotating at high speeds wherein the lubricant is air or oil.

A further object is to provide a hydrodynamically functioning bearing having a journal surface and a bearing surface which when the bearing is under load are supported by a film of lubricant.

It is also an object to provide an axial and radial thrust bearing which is easy to manufacture by eliminating the requirement that the journal surface and the bearing surface be machined to have nearly identically shaped surfaces and dimensions.

Other objects and novel features of the invention are pointed out in the following description and claims and illustrated in the accompanying drawing, which disclose, by way of example, the principle of the invention and the best mode, which has been contemplated, of applying that principle.

Figure 2:
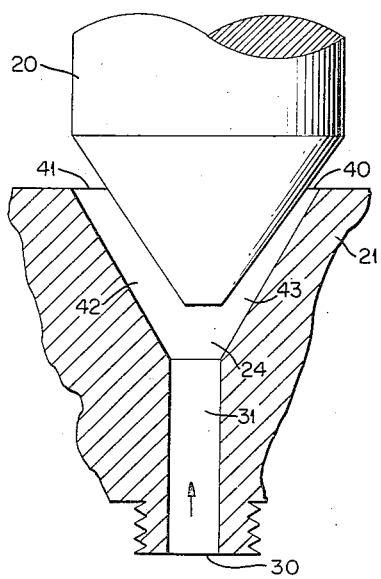

In the drawings:

Fig. 1 illustrates a cross-sectional view through the journal and its associated bearing blocks; and Fig. 2 illustrates pressure versus distance relationships associated with the conical bearing.

Referring more particularly to Fig. 1, a diagrammatic representation of the rotor or shaft 20 supported by the bearing blocks 21 and 22 is shown. The bearing blocks are illustrated in cross section so as to more clearly illustrate the interior structure of each bearing. At each extremity of the rotor is a conically shaped journal which is received by a conically shaped opening cut in each bearing block. The construction of each journal and each bearing block is identical. The conical journal 23, for example, protrudes into the hole 24 of the bearing block 21. The journal 23 may be a cone or a frustum of a cone whose axis of revolution coincides with the longitudinal axis of the rotor 20. Similarly, the opening or hole 24 is generally a frustum of a cone whose axis of revolution coincides with the axis of the rotor when said journal is seated within said bearing block and centered in the axial and radial directions. The angle 25 of the vertex or projected vertex of journal 23 must be larger than the angle 26 of the projected vertex of the frustum defined by the opening 24 within bearing block 21. The relationships stated between these angles are essential to the proper operation of the novel bearing.

The novel bearing may be utilized in a stationary or rotating type of operation. If it is to be rotated, the motivating power may be supplied, for example, by a stream of air impinging upon the bucket scoops such as 28 of Fig. 1, which are machined in the rotor. The rotor may also be rotated by any conventional means.

In Fig. 1 a lubricant is delivered under pressure through tube 30 to a hole 31 which is cut through the bearing block 21 to intersect the frustum shaped hole 24. The lubricant flows through the hole 31 and exerts a pressure upon the surfaces of the rotating journal 23 of the rotor 20. Similarly, a lubricant under pressure is delivered through tube 34 which is connected to a hole 35 cut through the bearing block 22. The pressure of the lubricant supplied through tubes 30 and 34 to the bearing is dependent upon the load applied to each of the bearings. When pressure is applied, the journal may be floated and even while the rotor 20 is rotating, a thin film of lubricant is maintained between each of the conical surfaces of the journals and their associated bearing blocks. Thus, when both of the bearings are operating properly, the journal and any load connected thereto is supported by the two bearing blocks without making contact therewith.

It is to be understood that the lubricant supplied to the novel bearing may be air, oil or any suitable fluid which may be supplied under pressure. However, the bearing may be lubricated by employing a bath type of lubrication wherein the journal and the bearing block is submerged in a pool of lubricant, or where the lubricant is freely supplied to the bearing surfaces. Where the lubricant is supplied under pressure, the pressure thereof should be maintained substantially constant.

With respect to Fig. 1, an external load is generally applied to each of the bearing blocks 21 and 22 which tend to force said blocks towards each other, that is, towards the journals formed on the rotor 20. An external load may also be applied in certain instances to the rotor. By the use of the novel bearing, at each extremity of the rotor, the action of the lubricant tends to counteract loading forces which tend to disrupt the radial and axial centering of the rotor. Where the rotor is operated in a vertical position as illustrated in Fig. 1, the weight of the rotor tends to load the system in a downward direction so that the spacings between the lower journal and bearing block 22 may differ slightly and the spacings between journal 23 and bearing block 21. It should be appreciated however, that the spacings illustrated in Fig.1 are greatly exaggerated in order to provide a clear understanding of the novel bearing.

The novel bearing illustrated in Fig. 1 is capable of reacting to axial and radial thrusts which may be the result of the application of a load to the rotor 20. The axial thrust is supported by the effective pressure produced in the space between the surface of the journal and the bearing surface of the bearing block. This pressure is due to the lubricant flowing through this space and emerging at points 40 and 41. This effective pressure increases as the clearance at point 40 and 41 decreases due to the change in the quantity of lubricant flowing or the change in load applied to the rotor. The radial thrust is supported by the difference in the effective pressures which may exist on opposite sides of the bearing as, for example, at points 40 and 41.

Consider that the journal 23, for example, is forced to the right by a loading force as illustrated in Fig. 2. This tends to decrease the space at point 40 between the journal and the bearing block 21. Since the spacing at point 40 is decreased, the pressure along this edge is materially increased. The opening at point 41 has been increased and thus a greater quantity of fluid is flowing therefrom. Accordingly, the pressure along this edge is materially decreased. The unbalance obtained between the pressure exerted on opposite sides of the journal tend to force the journal 23 to the left thereby tending to align or center the journal 23 within the hole 24. As the journal is radially centered within hole 24, the pressures exerted on the sides of the journal tend to equalize.

When the rotor 20 is subjected to an axial load which, for example, would tend to force the rotor downwards into the bearing block so as to decrease the spacing at points 40 and 41, the pressure of the fluid flowing through the space 24 is increased so as to tend to force the rotor upwards and thereby prohibit the journal from making contact with the bearing block 21.

It is apparent that if the rotor is forced downward, the high pressure at the vertex of the cone of the lower journal tends to force it upwards.

When the rotor 20 is stationary and no lubricant is supplied under pressure to the vertex of each bearing, the journals are seated within the openings 24 in each of the bearing blocks. Prior to rotating the rotor, the lubricant under pressure should be supplied through the channels 31 and 35 to each of the bearings so as to cause the rotor to be floated. When the rotor is floated, the journals generally do not make contact with the bearing blocks. After the rotor has been floated, the motivating force which effects rotation of the rotor may be supplied thereto. When the rotor is rotating, a hydrodynamic film of lubricant exists between the surface of a journal and the surface of the associated bearing block. It should be appreciated that during normal operation of the bearing the spacing at points 40 and 41 is relatively small and is probably less than one thousandth of an inch.

Since the surface of a journal and the bearing surface within the associated bearing block are not in continuous contact, it is not required that said surfaces be highly machined. Also, since the novel bearing reacts to axial and radial thrust loads, it is not necessary that the rotor 20 of Fig. 1 be perfectly balanced. Experiments have proven that a poorly balanced rotor can be rotated at speeds upwards of 100,000 R. P. M.

It is clear therefore that since bearing surfaces of the novel bearing do not need to be highly machined to close tolerances and since the rotor need not be perfectly balanced dynamically, the novel bearing is capable of being constructed without the difficulties frequently encountered where precision and close tolerances are required.

Because of relatively large angular differences between the journals and their respective bearings, a very high degree of misalignment between the surfaces of the journals and the bearings may be tolerated. That is, the center lines of the journals and/or the bearings may be skewed with respect to one another without encountering difficulty. Accordingly, the self-aligning features of the novel bearing permit the use thereof in a device wherein the bearings are not easily constructed in complete alignment.

While there have been shown and described and pointed out the fundamental novel features of the invention as applied to a preferred embodiment, it will be understood that various omissions and substutitions and changes in the form and details of the device illustrated and in its operation may be made by those skilled in the art, without departing from the spirit of the invention. It is the intention, therefore, to be limited only as indicated by the scope of the following claims.

What is claimed is:

1. An axial and radial thrust bearing comprising, a longitudinal shaft rotating on its axis; a conically shaped journal on each extremity of said shaft, the vertex of the cone having a predetermined angle; a bearing block in juxtaposition with each journal having a conical hole to receive the journal, the vertex of the cone of each said conical hole having a predetermined angle smaller in magnitude than the predetermined angle of said journal, and said bearing block including an aperture intersecting the vertex of said conically shaped hole for supplying a lubricant under constant pressure to the bearing.

2. A self-aligning hydrodynamic bearing responsive to axial and radial thrust comprising: a rotatable shaft having a journal on each end of said shaft and said journal having a conical surface of revolution; a bearing block in juxtaposition with each journal to receive a portion of the conical journal in a conically shaped hole, said conically shaped hole having a vertex angle smaller in magnitude than the angle of the vertex of said conically shaped journal; and means for supplying a lubricant under constant pressure to the surfaces of said conically shaped hole and said conically shaped bearing.

3. The invention of claim 2 wherein the means for supplying a lubricant comprises an aperture defined by said bearing block, said aperture communicating with the vertex of said bearing.

4. In a device for freely supporting a rotor, conically shaped journals formed at the respective ends of said rotor; bearing blocks for supporting said rotor, each formed with an opening in the shape of a cone which has a smaller vertex angle than said journals; and said bearing blocks being provided with means for delivering fluid under pressure to the inner ends of said openings to provide for the radial centering of said journals in their respective blocks and the axial centering of said rotor between the two bearing blocks.

5. An axial and radial thrust bearing comprising, a bearing block, a right conic bearing surface within said bearing block, said bearing block defining an aperture communicating with the vertex of said bearing surface for supplying a lubricant under pressure to said surface, a journal formed with a conic surface different than said first mentioned surface and arranged to project into said bearing block in fitting relation and abutting said bearing block at a point parallel to the base of the cone of said journal when said journal is stationary, the angle of the vertex of said bearing surface is smaller than the angle of the vertex of said journal whereby a maximum effective area of said journal is exposed to the pressurized lubricant to thereby control the axial and radial positions of said journal with respect to the axis of revolution of said bearing surface, said journal being continuously urged in an axial direction to oppose a load applied thereto and simultaneously responsive to a pressure on one surface of said journal in a radially uncentered position to urge the journal back to a radial centered position.

6. The invention of claim 5 wherein the diameter of the bearing of the cone defining said conic bearing surface is twice the diameter of the aperture communicating with the vertex of this cone.

7. The invention of claim 5 wherein said conic bearing surface within said bearing block defines a frustum of a cone.

8. A device freely supporting a rotor comprising a pair of journals formed at the respective ends of said rotor, said journals comprising a right cone whose axis of revolution coincides with the axis of said rotor; a bearing surface for each journal formed within a bearing block which receives said journal, said bearing surface defined by a frustum of a right cone wherein the projected vertex angle of said frustum is smaller than the vertex of said journal whereby said journal is not in close fitting relation with all of said bearing surface when said rotor is stationary and each said journal is seated within said bearing block; said bearing block including a channel communicating with the inner end of said frustum for supplying a lubricant under pressure thereto whereby a larger pressure is applied to one side of said journal in a radially uncentered position and a lower pressure is supplied to the other side thereof to effect a resultant force that urges each said journal to a radially centered position; and means for supplying external loads to each bearing block to urge said bearing blocks towards said rotor in a manner that the lubricant under pressure applies an axial force to said rotor to continuously urge the latter towards an axially centered position.

References Cited in the file of this patent

UNITED STATES PATENTS

| | | |
|---|---|---|
| 2,177,053 | Boyd | Oct. 24, 1939 |
| 2,722,463 | Shaw et al. | Nov. 1, 1955 |

FOREIGN PATENTS

| | | |
|---|---|---|
| 319,018 | Germany | Feb. 21, 1920 |